3,426,134
SLIMICIDAL COMPOSITION AND METHOD

Bernard F. Shema, Glenside, Pa., John P. Reilly, Cherry Hill, N.J., and Paul E. Kubasko, King of Prussia, Pa., assignors to Betz Laboratories, Inc., Philadelphia, Pa., a corporation of Pennsylvania
No Drawing. Filed Mar. 9, 1966, Ser. No. 532,890
U.S. Cl. 424—302          10 Claims
Int. Cl. A01n 9/18, 9/14

ABSTRACT OF THE DISCLOSURE

The invention concerns biocides containing methylene bisthiocyanate and bis(trichloromethyl) sulfone or bis (tribromomethyl) sulfone and particularly the use of these biocides in aqueous paper mill systems and cooling water for the control of slime formed by microorganisms. The combination of the thiocyanate and sulfone yields a synergism in which the cooperative action of the combined ingredients produces a total effect which is greater than the sum of the effects of the ingredients when taken separately. A typical composition within the invention comprises 20% by weight of methylene bisthiocyanate and 80% by weight of bis(trichloromethyl) sulfone.

---

The present invention relates to biocidal compositions for use in the control of slime-forming organisms in the water employed in paper or pulp mills, cooling systems and other industrial water systems, and particularly to compositions comprising the combination of methylene bis dithiocyanate and a bis trihaloalkyl sulfone, and methods for employing these compositions.

The trihaloalkyl sulfones have demonstrated high efficiencies in the control of microorganisms present in the aqueous systems utilized in the manufacture of paper products, e.g., paper mill white water, and in cooling, e.g., the water used in cooling towers, air washers, and the like. The presence of microorganisms in such systems generally impairs their efficiency and in the case of paper and pulp products may irreparably contaminate and/or reduce the quality and production rate of the final product.

However, these sulfones cause lachrymation at comparatively low levels. For example, the presence of as little as 10 parts per million of these compounds in the white water of a paper mill may cause extreme discomfort to the operating personnel. While higher concentrations may often be employed in cooling water, the same problems are experienced during unusual wind conditions, or if the cooling tower or air washer is located in proximity to an inhabited structure or area, or an air intake leading to such a structure or area.

It is an object of the present invention to provide biocidal compositions which are effective at low concentrations against the microorganisms present in the water employed in paper and pulp mills, cooling systems and the like.

Another object is the provision of biocidal compositions which utilize the biocidal effectiveness of haloalkyl sulfones, while avoiding the lachrymation problem which otherwise attends the use of these compounds.

A further object is the provision of methods for the control of slime forming organisms in paper mill and cooling water, which involve the use of low concentrations of a biocidal agent.

Other objects will be made apparent by the balance of the specification and claims.

The objects of the invention are achieved by combining a trihaloalkyl sulfone with methylene bis dithiocyanate. By means of such a combination, the total quantity of biocide required for effective treatment may be reduced. In addition, the high degree of biocidal effectiveness which is provided by the haloalkyl sulfones may be exploited without the realization of a lachrymation problem. Furthermore, the combination provides an unexpected synergistic relationship in which the cooperative action of the combined ingredients yields a total effect which is greater than the sum of the effects of the two ingredients taken separately.

The methylene bis dithiocyanate which is employed by the invention possesses the formula $CH_2(SCN)_2$ and is disclosed by German Patents 520,330 and 545,740.

The haloalkyl sulfones utilized in the practice of the invention are bis-(trichloromethyl-sulfone and bis-(tribromomethyl)-sulfone, as disclosed by U.S. 2,959,517 and 3,051,757.

To demonstrate the synergism which is provided by the inventive combinations of compounds, as well as the low concentrations of bis-trihalomethyl sulfones which are made possible in the highly effective biocidal compositions of the invention, the data set forth in Table 1 has been prepared. In the preparation of this data, the concentrations of biocidal compositions indicated, were tested in a paper mill white water sample which was secured from a commercial paper mill.

It should be noted that the negative values set forth in Table 1, as well as in Table 4 which is subsequently discussed, indicate a condition in which the microorganisms are not only unaffected by the biocides, but actually show increased growth. For example, —61.3 indicates that Sample 2a contained 61.3% more microorganisms than the control which was devoid of a biocidal compound.

As demonstrated by Table 1, the biocidal effect of the combined ingredients is many times as great as the additive effect of the individual ingredients and clearly indicates the existence of synergism. At the same time, it may be observed that effective biocides are obtained while the concentration of the lachrymation inducing sulfone is maintained at a low level. Samples 2 and 3 show that the combined ingredients yield a biocidal effect which is much greater than the additive effect of the ingredients contained by these combinations. Sample 4 more clearly demonstrates synergism since a concentration of the combined ingredients which is 37.5% less than the concentration of either of the ingredients used alone yields a biocidal effect which is 10% greater than the biocidal effect obtained when either of the ingredients is used alone in greater concentrations. A mere 1.25 p.p.m. of the inventive combination yields a 61.8% kill while 2 p.p.m. of methylene bis dithiocyanate yields a kill of only 56.2% and 2 p.p.m. of the sulfone actually permits the continued growth of the microorganisms.

TABLE 1

| Sample | Biocide | Quantity of each individual biocide (p.p.m.) | Total quantity of biocide (p.p.m.) | Number of organisms present after 3 hour incubation | Percentage of microorganisms killed by the treatment | Theoretical kill if the effect of the ingredients was merely additive |
|---|---|---|---|---|---|---|
| 1 | None—control | 0 | 0 | 2,155,000 | | |
| 2(a) | Methylene bisdithiocyanate | 0.5 | 0.5 | 3,500,000 | −61.3 | |
| 2(b) | Bis-(trichloromethyl)-sulfone | 2.0 | 2.0 | 2,350,000 | −8.3 | |
| 2(c) | Methylene bisdithiocyanate, bis-(trichloromethyl)-sulfone (1:4). | 0.5 / 2.0 | 2.5 | 320,000 | 85.3 | −61.3 |
| 3(a) | Methylene bis dithiocyanate | 1.0 | 1.0 | 2,230,000 | −2.8 | |
| 3(b) | Bis-(trichloromethyl)-sulfone | 4.0 | 4.0 | 870,000 | 59.9 | |
| 3(c) | Methylenebisdithiocyanate, bis-(trichloromethyl)-sulfone (1:4). | 1.0 / 4.0 | 5.0 | 303,000 | 86.0 | 57.9 |
| 4(a) | Methylenebisdithiocyanate | 2.0 | 2.0 | 950,000 | 56.2 | |
| 4(b) | Bis-(trichloromethyl)-sulfone | 2.0 | 2.0 | 2,350,000 | −8.3 | |
| 4(c) | Methylene bis dithiocyanate, bis-(trichloromethyl)-sulfone (4:1). | .25 / 1.00 | 1.25 | 830,000 | 61.8 | |

Further evidence of the reduced lachrymatory potential of the inventive biocides is provided by Table 2 which demonstrates the effectiveness of biocidal compositions containing between 1–8 p.p.m. of the sulfone. These data were also obtained with the white water sample employed in Table 1.

TABLE 2

| Sample No. | Total quantity of biocide (p.p.m.) | Quantity of bis-(trichloromethyl)-sulfone (p.p.m.) | Quantity of methylene bis dithiocyanate (p.p.m.) | Percentage kill |
|---|---|---|---|---|
| 4 | 1.25 | 1 | 0.25 | 61.8 |
| 5 | 2.50 | 2 | 0.5 | 85.3 |
| 6 | 5.00 | 4 | 1.0 | 86.0 |
| 7 | 10.00 | 8 | 2.0 | 91.5 |

The data set forth in Table 3 further indicates the improved results, synergistic effect, reduced sulfone content and various sulfone: thiocyanate ratios, which may be achieved with, or employed in, the practice of the present invention.

TABLE 3

| Sample No. | Biocidal ingredients | Minimum theoretical quantities of these ingredients which would be expected to yield complete inhibition (p.p.m.) | Quantity actually required for the achievement of complete inhibition (p.p.m.) |
|---|---|---|---|
| 8 | Bis-(trichloromethyl)-sulfone. | | 15 |
| 9 | Methylene bis dithiocyanate. | | 4 |
| 10 | 80:20 admixture of 8 and 9. | 7.74 p.p.m. of sulfone. 1.94 p.p.m. of thiocyanate. | 5.0 1.25 |
| 11 | 25:75 admixture of 8 and 9. | 1.225 p.p.m. of sulfone. 3.675 p.p.m. of thiocyanate. | 1 3 |

The data in Table 3 was achieved by means of an agar substrate method in which the biocidal materials were added to a nutrient substrate which was then innoculated with *Aerobacter aerogenes*. The quantity of the additives was increased until no organism growth could be observed at the end of a 48-hour incubation period.

It may be seen that the synergistic effect provided by the 80:20 combination of ingredients increases the effectiveness of the ingredients by 35%, while in the case of the 25:75 admixture a 32% increase is provided. At the same time, the inventive admixtures permit the reduction of the quantity of the lachrymation inducing sulfone by 75% and 93%. The theoretical values for predictable quantities of the ingredients required for complete inhibition were calculated on the basis of the effectiveness of the ingredients. For example, since 15 p.p.m. of the sulfone are required for 100% inhibition, each part per million yields 6.67% inhibition. Similarly, each part per million of the dithiocyanate provides 25% inhibition. Accordingly, in an 80:20 admixture of these ingredients it would be expected that 7.740 p.p.m. of the sulfone, and 1.94 p.p.m. of the dithiocyanate would be required for 100% inhibition, in the absence of synergism.

It should be noted that when the inventive compositions are employed in the treatment of cooling or paper mill water, they are preferably utilized in the form of relatively dilute dispersions. For example, a preferred dispersion comprises between 5 to 65% by weight of the synergistic combination of biocides in admixture with various solvents and solubilizing agents. An example of such a dispersion comprises 12.5% by weight of methylene bis dithiocyanate, 12.5% by weight of bis-(trichloromethyl)-sulfone, and equal parts by weight of isopropanol, hexylene glycol and dimethyl formamide. Surfactants such as the alkylarly polyether alcohols, polyether alcohols, sulfonates and sulfates, and the like, may also be employed to enhance the dispersability and stability of these dispersions. The foregoing dispersions of the biocidal compositions are utilized in order to insure the rapid and uniform dispersibility of the biocides within the industral water which is treated. It has been found that non-aqueous solvents are generally suitable in the preparation of the dispersions of the invention, e.g., alkyl benzene sulfonates and aromatic kerosenes. In the treatment of paper-mill and cooling water, effective biocidal action is obtained when the concentration or treatment level of the combined or admixed biocides, i.e., dithiocyanate and sulfone, is between 0.5 parts per million to 75 parts per million, and preferably between 1 and 30 parts per million, based upon the total content of the system treated, i.e., total quantity of cooling water or paper mill water. The compositions of the invention may be fed continuously to the treated system, e.g., by means of a metered pump, or may be fed periodically at intervals calculated to control the growth of slime-forming organisms in the system. Naturally, in the treatment of cooling water the feeding of the inventive compositions must be designed to compensate for blowdown in those systems which employ that expedient.

In addition, the dithiocyanate and sulfone may be employed in varying ratios from 5:95 to 95:5 although a 20:80 ratio is preferred.

To specifically demonstrate the improved results and effectiveness of the inventive compositions in the form preferred for commercial application, the results set forth in Table 4 were derived. This data is based upon studies conducted with white water obtained from a commercial paper mill and contrasts a preferred embodiment of the present invention with three commercially available biocides which are commonly and currently used in the treatment of paper mill white water. This toxicant evaluation includes a three hour and a six hour microorganism count and all of the figures set forth in Table 4 represent the percentage of microorganisms killed by the various biocides at the treatment levels indicated.

TABLE 4

| Biocide | A | B | C | D |
|---|---|---|---|---|
| I. Three hour contact time | | | | |
| Quantity of biocide (p.p.m.): | | | | |
| 5 | −77.0 | X | −14.7 | X |
| 10 | 13.6 | X | −47.7 | −30.1 |
| 25 | 86.4 | −72.3 | 46.4 | −17.9 |
| 50 | 97.0 | −34.9 | 74.7 | 39.5 |
| II. Six hour contact time | | | | |
| 5 | −36.0 | X | −68.5 | X |
| 10 | 14.9 | X | −142.1 | −19.5 |
| 25 | 92.5 | −19.5 | 45.6 | 34.9 |
| 50 | 99.3 | 13.1 | 63.5 | 46.0 |

The X's employed in the above table indicate a condition in which the growth of microorganisms was so great as to prevent an accurate count.

Biocide A comprises a preferred embodiment of the invention in which 25% by weight of a 4:1 admixture of bis(trichloromethyl)-sulfone and methylene bis dithiocyanate, respectively, are dispersed in equal parts by weight of isopropanol, hexylene glycol and dimethyl formamide. Biocide B contains a dispersion of 21% by weight of dimethyltetrahydro-1.3.5.2H-thiadiazine - 2 - thione and 6% by weight of mercaptobenzothiazole. Biocide C contains a dispersion of 20% by weight of bis(trichloromethyl)sulfone and 15% by weight of mixed N-alkyl dimethyl benzyl ammonium chlorides in which the mixed alkyl groups contain between 14–16 carbon atoms. Biocide D contains 24% by weight of sodium pentachlorophenate, 8.5% by weight of sodium 2,4,5-trichlorophenate, 4.1% of sodium salts of other chlorophenols, 4% of sodium dimethyl dithiocarbamate and 5% of mixed N-alkyl dimethyl benzyl ammonium chlorides in which the alkyl groups contain between 14–16 carbon atoms.

It must be noted that the inventive biocide yields a superior biocidal activity despite the fact that the other biocides contain a higher concentration of biocidal ingredients, i.e., 27–45.6% by weight as contrasted with 25% by weight in the inventive composition. For example, the 25% concentration of the inventive composition yields a kill of 97–99.3% at the 50 p.p.m. treatment level after 3 and 6 hours, whereas the biocide containing 45.6% of biocidal ingredients (Biocide D) yields a kill of 39.5–46.0% at the same treatment level. In all instances the inventive biocide is greatly superior to the commercially available biocides.

It should also be noted that at the 50 p.p.m. treatment levels of Table 4, the inventive composition contains only 10 p.p.m. of the sulfone and is therefore devoid of a lachrymation problem at those treatment levels. It must be realized that a 50 p.p.m. treatment with the dispersions of these biocides in a laboratory analysis, may be replaced by lower treatment levels in the actual treatment of a paper mill or cooling tower.

The results obtained with the foregoing combinations of methylene bis dithiocyanate and bis-(trichloromethyl)-sulfone, may also be realized with the substitution of bis-(tribromomethyl)-sulfone for the chlorine substituted compound.

It should be noted that while the preponderance of the specification has dealt specifically with the treatment of the aqueous systems employed in paper and pulp mills and cooling systems, the compositions and methods of the present invention are broadly applicable to the treatment of industrial waters which are plagued by deposits formed by slime forming organisms, or by the very presence of such organisms.

It is apparent that biocidal compositions demonstrating extensive effectiveness in the treatment of paper-mill and cooling water, and methods for the use of these compositions, have been provided by the present invention. It is also apparent that the inventive compositions and methods permit low biocidal use concentrations, provide a synergistic effect, and permit the exploitation of the biocidal effectiveness of the bis (trihaloalkyl) sulfones without the realization of a lachrymation problem which normally attends the use of these compounds.

We claim:
1. A slimicidal composition consisting essentially of an admixture of between 5 to 95% by weight of methylene bisdithiocyanate and between 95 to 5% by weight of bis-(trichloromethyl)-sulfone.
2. A slimicidal composition as claimed by claim 1 in which said dithiocyanate is present in a quantity of 20% by weight and said bis-(trichloromethyl)-sulfone is present in a quantity of 80% by weight.
3. A slimicidal composition as claimed by claim 1 in which between 5 to 65% by weight of said admixture is dispersed in between 35 to 95% by weight of a non-aqueous solvent.
4. A slimicidal composition as claimed by claim 3 in which said non-aqueous solvent is a mixture of equal parts by weight of isopropanol, hexylene glycol and dimethyl formamide.
5. A slimicidal method for the control of slime in industrial water, comprising dispersing in said water between 0.5 to 75 parts per million of an admixture of between 5 to 95% by weight of methylene bis dithiocyanate and between 95 to 5% by weight of bis-(trichloromethyl)-sulfone.
6. A slimicidal method as claimed by claim 5 in which said dithiocyanate is present in a quantity of 20% by weight and said bis-(trichloromethyl)-sulfone is present in a quantity of 80% by weight.
7. A slimicidal method as claimed by claim 5 in which said admixture is added to said water as a dispersion of between 5 to 65% by weight of said admixture in between 35 to 95% by weight of a non-aqueous solvent.
8. A slimicidal method as claimed by claim 7 in which said non-aqueous solvent is a mixture of equal parts by weight of isopropanol, hexylene glycol and dimethyl formamide.
9. A slimicidal method as claimed by claim 5 in which said industrial water is the aqueous component of an aqueous suspension of cellulosic pulp employed in the manufacture of paper and pulp.
10. A slimicidal method as claimed by claim 5 in which said industrial water is cooling water.

References Cited

UNITED STATES PATENTS

| 2,959,517 | 11/1960 | Bowers et al. | 167—22 |
| 3,051,757 | 8/1962 | Johnston | 167—22 |
| 3,252,855 | 5/1966 | Wehner | 106—15 XR |

ALBERT T. MEYERS, *Primary Examiner.*

D. R. MAHANAND, *Assistant Examiner.*

U.S. Cl. X.R.

210—164; 162—161; 106—15; 424—337, 358

UNITED STATES PATENT OFFICE
CERTIFICATE OF CORRECTION

Patent No. 3,426,134                  Dated      Feb. 4, 1969

Inventor(s)     Bernard F. Shema et al

It is certified that error appears in the above-identified patent and that said Letters Patent are hereby corrected as shown below:

Substitute "methylene bisthiocyanate" for methylene bisdithiocyanate which appears in the patent as follows:

Column 1, line 33
Column 2, lines 8, 19, 60
Column 3, Table 1      Column 3, Table 2      Column 3, Table 3
    Sample 2(a)(c)                                        Sample 9
    Sample 3(a)(c)
    Sample 4(a)(c)
Column 4, line 31
Column 5, lines 20, 57
Column 6, lines 14, 31

Substitute "thiocyanate" for dithiocyanate which appears in the patent as follows:

Column 4, lines 18, 21, 46, 59
Column 6, lines 17, 35

Signed and sealed this 2nd day of May 1972.

(SEAL)
Attest:

EDWARD M. FLETCHER, JR.                   ROBERT GOTTSCHALK
Attesting Officer                                  Commissioner of Patents